US006649911B2

(12) United States Patent
Kawato

(10) Patent No.: US 6,649,911 B2
(45) Date of Patent: Nov. 18, 2003

(54) METHOD OF SELECTING IONS IN AN ION STORAGE DEVICE

(75) Inventor: Eizo Kawato, Souraku-gun (JP)

(73) Assignee: Shimadzu Corporation, Kyoto (JP)

(*) Notice: Subject to any disclaimer, the term of this patent is extended or adjusted under 35 U.S.C. 154(b) by 0 days.

(21) Appl. No.: 10/198,966

(22) Filed: Jul. 22, 2002

(65) Prior Publication Data

US 2003/0071211 A1 Apr. 17, 2003

(30) Foreign Application Priority Data

Jul. 31, 2001 (JP) ........................................ 2001-231106

(51) Int. Cl.[7] .......................... B01D 59/44; H01J 49/00

(52) U.S. Cl. ....................... 250/293; 250/281; 250/282; 250/283; 250/288; 250/290; 250/292; 250/297; 250/299; 250/300

(58) Field of Search ................................ 250/281, 282, 250/283, 288, 290, 292, 293, 297, 299, 300

(56) References Cited

U.S. PATENT DOCUMENTS 5,206,509 A * 4/1993 McLuckey et al. ......... 250/292
5,696,376 A * 12/1997 Doroshenko et al. ....... 250/292
5,714,755 A * 2/1998 Wells et al. ................ 250/281
6,294,780 B1 * 9/2001 Wells et al. ................ 250/288
2002/0102610 A1 * 8/2002 Townsend et al. ........... 435/7.1
2003/0071211 A1 * 4/2003 Kawato ...................... 250/300

* cited by examiner

*Primary Examiner*—John R. Lee
*Assistant Examiner*—Bernard Souw
(74) *Attorney, Agent, or Firm*—Armstrong, Westerman & Hattori, LLP

(57) ABSTRACT

The present invention describes a method of selecting ions in an ion storage device with high resolution in a short time period while suppressing amplitude of ion oscillation immediately after the selection. In a method of selecting ions within a specific range of mass-to-charge ratio by applying an ion-selecting electric field in an ion storage space of an ion storage device, the method according to the present invention is characterized in that the ion-selecting electric field is produced from a waveform whose frequency is substantially scanned, and the waveform is made anti-symmetric by multiplying a weight function whose polarity reverses, or by shifting a phase of the waveform by odd multiple of $\pi$, at around a secular frequency of the ions to be left in the ion storage space. It is preferable that the frequency of the waveforms is scanned in a direction where the frequency decreases. It is also preferable that the weight function is linearly changed at the boundaries of the scanning range of the frequency.

18 Claims, 5 Drawing Sheets

METHOD OF SELECTING IONS IN AN ION STORAGE DEVICE

The present invention relates to a method of selecting ions in an ion storage device with high resolution in a short time period while suppressing amplitude of ion oscillation immediately after the selection.

BACKGROUND OF THE INVENTION

In an ion storage device, e.g. a Fourier transformation ion cyclotron resonance system or an ion trap mass spectrometer, ions are selected according to their mass-to-charge (m/e) ratio. While the ions are held within an ion storage space, a special electric field is applied to the ion storage space to selectively eject a part of the ions having specified m/e values. This method, including the storage and selection of ions, is characteristically applied to a type of mass spectrometry called an MS/MS. In an MS/MS mass spectrometry, first, ions with various m/e values are introduced from an ion generator into the ion storage space, and an ion-selecting electric field is applied to the ion storage space to hold within the space only such ions having a particular m/e value while ejecting other ions from the space. Then, another special electric field is applied to the ion storage space to dissociate the selected ions, called precursor ions, into dissociated ions, called fragment ions. After that, by changing the system parameters, the fragment ions created in the ion storage space are ejected toward an ion detector to build a mass spectrum. The spectrum of the fragment ions contains information about the structure of the precursor ions. This information makes it possible to determine the structure of the precursor ions, which cannot be derived from a simple analysis of the m/e ratio. For ions with complex structures, more detailed information about the ion structure can be obtained by a repetition of selection and dissociation of the ions within the ion storage device ($MS^n$ analysis).

The special electric field for selecting ions is usually produced by applying voltages having waveforms with opposite polarities to a pair of opposite electrodes which define the ion storage space. The special electric field is produced without changing the ion storage condition. In an ion trap mass spectrometer, voltages having waveforms of opposite polarities are applied to a pair of end cap electrodes, while a radio frequency (RF) voltage is applied to a ring electrode placed between the end cap electrodes. The RF voltage independently determines the ion storage condition.

Each of the ions stored in the ion storage device oscillates at the secular frequency which depends on the m/e value of the ion. When an appropriate electric field for selecting particular ions is applied, the ions oscillate according to the electric field. If the electric field includes a frequency component close to the secular frequency of the ion, the oscillation of the ion resonates to that frequency component of the electric field, and the amplitude gradually increases. After a period of time, the ions collide with the electrodes of the ion storage device or are ejected through an opening of the electrodes to the outside, so that they are evacuated from the ion storage space. In the case of an ion trap mass spectrometer, the secular frequency of an ion in the radial direction differs from that in the axial direction. Usually, the secular frequency in the axial direction is used to remove ions along the axial direction.

Waveforms available for selecting ions include the Stored Waveform Inverse Fourier Transformation (SWIFT; U.S. Pat. No. 4,761,545), Filtered Noise Field (FNF; U.S. Pat. No. 5,134,826), etc. Each of these waveforms is composed of a number of sinusoidal waves with different frequencies superimposed on each other, wherein a frequency component of interest is excluded (this part is called a "notch"). The strength of the ion-selecting electric field produced by the waveform is determined so that ions having such secular frequencies that resonate to the frequency component of the waveform are all ejected from the ion storage space. Ions having secular frequencies equal or close to the notch frequency, which is not contained in the waveform, do not resonate to the electric field. Though these ions might oscillate with a small amplitude, the amplitude does not increase with time, so that the ions are not ejected from the ion storage space. As a result, only such ions that have particular secular frequencies are selectively held in the ion storage space. Thus, the selection of ions is achieved.

However, even if the frequency of the excitation field slightly differs from the secular frequency of the ions, the ions can be excited and the amplitude of the oscillation of the ions increases. This means that the ion selection does not depend solely on whether the waveform contains a frequency component equal to the secular frequency of the ion. Therefore, the notch frequency is determined to have a certain width. However, the ions having a secular frequency at the boundary of the notch frequency are still unstable in oscillation.

As regards the conventional ion-selecting waveforms represented by SWIFT and FNF, past significance has primarily focused on whether the frequency components of the ion-selecting wave include the secular frequency of the ions to be held in the ion storage space.

In a practical mass spectrometry, various processes are performed after the ions are selected. An example of the process is the excitation of precursor ions with an electric field to produce fragment ions, called "fragmentation". In this process, the strength of the excitation field needs to be properly adjusted so as not to eject the precursor ions from the ion storage space. Excessive decrease in the strength of the electric field, however, results in an inefficient fragmentation. Accordingly, the strength of the electric field needs to be controlled precisely. When the initial amplitude of the ion oscillation is large before the excitation field is applied, the ions may be ejected even with a weak electric field. In an ion trap mass spectrometer, the RF voltage needs to be lowered before fragmentation to establish a condition for the fragment ions to be stored. In this process, if the initial amplitude of the oscillation of the precursor ions is large, the motion of the precursor ions becomes unstable, and the ions are ejected from the ion storage space. It is therefore necessary to place a "cooling process" for waiting for the oscillation of the precursor ions to subside before fragmentation. Placing such a process consequently leads to a longer time for completing the entire processes, and deteriorates the throughput of the system.

In theory, in an ion trap mass spectrometer, the strength of the RF electric field within the ion storage space determines the secular frequencies of the ions according to their m/e values. In practice, however, the RF electric field deviates slightly from the theoretically designed quadrupole electric field, so that the secular frequency is not a constant value but changes according to the amplitude of the ion oscillation. The deviation of the electric field is particularly observable around a center of the end cap electrodes because they have openings for introducing and ejecting ions. Around the opening, the secular frequency of the ion is lower than that at the center of the ion storage space. In the case of an ion whose secular frequency is slightly higher than the notch frequency, its amplitude increases due to the excitation field when it is at the center of the ion storage space. As the amplitude becomes larger, however, the secular frequency becomes lower, and approaches the notch frequency. This makes the excitation effect on the ion poorer. Ultimately, the amplitude stops increasing at a certain amplitude and begins to decrease.

In the case of an ion whose secular frequency is slightly lower than the notch frequency when it is at the center of the ion storage space, on the other hand, its amplitude increases due to the excited oscillation, and the secular frequency gradually departs from the notch frequency. This increases the efficiency of excitation, and the ion is ultimately ejected from the ion storage space. These cases show that, even if a notch frequency is determined, one cannot tell whether or not ions can be ejected by simply comparing the notch frequency with the secular frequency of the ions, because the interaction is significantly influenced by the strength of excitation field, the dependency of the secular frequency on the amplitude, etc. This leads to a problem that the width of a notch frequency is not allowed to be narrow enough to obtain an adequate resolution of ion selection.

None of the prior art methods presented a detailed theoretical description of the motion of ions in the excitation field: the width of the notch frequency or the value of the excitation voltage has been determined by an empirical or experimental method. To solve the above problem, it is necessary to precisely analyze the motion of ions with respect to time, as well as to think of the frequency components. Therefore, using some theoretical formulae, the behavior of ions in the conventional method is discussed.

First, the equation of the motion of an ion is discussed. In an ion trap mass spectrometer, z-axis is normally determined to coincide with the rotation axis of the system. The motion of an ion in the ion storage space is given by the well-known Mathieu equations. For the convenience of explanation, the motions of ions responding to the RF voltage are represented by their center of RF oscillation averaged over a cycle of RF frequency. The average force acting on the ions is approximately proportional to the distance from the center of the ion storage space (pseudo-potential well model; see, for example, "Practical Aspects of Ion Trap Mass Spectrometry, Volume 1", CRC Press, 1995, page 43). Thus, the equation of motion is given as follows:

$$\frac{d^2 z}{dt^2} + \omega_z^2 z = \frac{f_s(t)}{m}$$

$$\omega_z = \frac{eV}{\sqrt{2}\, m z_0^2 \Omega}$$

where, m, e and $\omega_z$ are the mass, charge and secular frequency of the ion, $f_s(t)$ is an external force, V and Ω are the amplitude and angular frequency of the RF voltage, and $z_0$ is the distance between the center of the ion trap and the top of the end cap electrode. Similar equations can be applied also to an FITCR system by regarding z as the amplitude from a guiding center along the direction of the excitation of oscillation.

When the external force $f_s(t)$ is an excitation field with a single frequency, it is given by $$\begin{aligned} f_s(t) &= F_s \exp(j\omega_s t) \\ &= eE_s \exp(j\omega_s t) \end{aligned}$$

where $F_s(=eE_s)$ is the amplitude of the external force, $E_s$ is the strength of the electric field produced in the ion storage space by $F_s$, $\omega_s$ is the angular frequency of the external force, and j is the imaginary unit. In an actual ion trap mass spectrometer or the like, the strength of the electric field in the ion storage space cannot be thoroughly uniform when voltages of opposite polarities $\pm v_s$ are applied to the end cap electrodes. In the above equation, however, the strength of the electric field is approximated to be a uniform value $E_s = v_s/z_0$. The amplitude is represented by a complex number. In a solution obtained by calculation, the real part, for example, gives the real value of the amplitude. Though the arbitrary phase term is omitted in the equation, it makes no significant difference in the result. Similarly, in the following equations, the arbitrary or constant phase term is often omitted.

With the above formula, the equation of motion is rewritten to give the following stationary (particular) solution:

$$\begin{aligned} z &= \frac{F_s}{m} \frac{1}{\omega_z^2 - \omega_s^2} \exp(j\omega_s t) \\ &\cong \frac{F_s}{2m\omega_z \Delta\omega} \exp(j\omega_s t) \end{aligned}$$

Here, $\Delta\omega = \omega_z - \omega_s$ is the difference between the frequency of excitation field and the secular frequency of the ion. As for general solution of the equation of motion, the state of motion greatly varies depending on the initial condition of the ion. For example, the condition with initial position z=0 and initial velocity dz/dt=0 brings about an oscillation whose amplitude is twice as large as that of the above stationary solution.

When the secular frequency $\omega_z$ of an ion is close to the frequency $\omega_s$ of the excitation field, or when $\Delta\omega$ is small, the oscillation amplitude of the ion increases enough to eject the ion.

As in the case of FNF, when the excitation field is composed of a number of sinusoidal waves superimposed on each other, it is possible to eject all the ions by setting the intervals of the frequencies of the excitation field adequately small, and by giving an adequate strength to the excitation field to eject even such an ion whose secular frequency is located between the frequencies of the excitation field. In order to leave ions with a particular m/e value in the ion storage space, the frequency components close to the secular frequency of the ions should be removed from the excitation field. The motion of the ions, however, is significantly influenced by phases of the frequency components around the notch frequency.

For example, when an ion with a secular frequency of $\omega_z$ is located at the center of the notch having the width of $2\Delta\omega$, the frequencies at both sides of the notch are $\omega_z \pm \Delta\omega$. Denoting the phases of the above frequency components by $\phi_1$ and $\phi_2$, the waveform composed is represented by the following formula (trigonometric functions are used for facility of understanding):

$$\sin((\omega_z-\Delta\omega)t+\phi_1)+\sin((\omega_z+\Delta\omega)t+\phi_2)=2\sin\left(\omega_z t+\frac{\phi_1+\phi_2}{2}\right)\cos\left(\Delta\omega t+\frac{\phi_2-\phi_1}{2}\right)$$

This formula contains an excitation frequency that is equal to the secular frequency $\omega_z$ of the ion. Therefore, even when an ion is located at the center of the notch, the ion experiences the excitation. The initial amplitude of the excitation voltage greatly changes according to the envelope of the cosine function depending on the difference $2\Delta\omega$ between the two frequencies. Thus, the phase of this enveloping function greatly influences the oscillation of the ion. Accurate control of the behavior of the ion is very difficult because of the presence of a greater number of frequency components of the excitation fields outside the notch with their phases correlating to each other.

This suggests that the actual motion of an ion cannot be described based solely on whether a particular frequency is included in the frequency components, or the coefficients of the Fourier transformation, of the excitation waveform. Therefore, when, as in FNF, the excitation field is composed of frequency components with random phases, the correlations of the phases of the frequency components in the vicinity of the notch cannot be properly controlled, so that the selection of ions with high resolution is hard to be performed.

Use of waveforms having harmonically correlated phases, as in SWIFT, may provide one possibility of avoiding the above problem. To allow plural frequency components of the excitation field to act on the ion at a given time point, a complicated control of the phases of the plural frequency components is necessary for harmonization. Therefore, the simplest waveform is obtained by changing the frequency with time. Further, for the convenience of analysis, the changing rate of the frequency should be held constant. Accordingly, the following description about the motion of the ion supposes that the frequency is scanned at a fixed rate.

With $\phi(t)$ representing a phase depending on time, let the waveform for selecting ions be given as follows:

$$f_s(t)=F_s\exp(j\phi(t))$$

The effective angular frequency $\omega_e(t)$ acting actually on the ion at the time point t, which is equal to the time-derivative rate of $\phi(t)$, is given by $$\omega_e(t)\equiv\frac{d\phi(t)}{dt}=at+\omega_0\ \therefore\ \phi(t)=\frac{a}{2}t^2+\omega_0 t+\phi_0$$

where $\phi_0$ and $\omega_0$ represent the phase and the angular frequency at the time point t=0, respectively, and a represents the changing rate of the angular frequency. The phase $\phi(t)$ is thus represented by a quadratic function of time t.

To examine what frequency components are contained in the external force, the formula is next rewritten as follows by the Fourier transformation.

$$F(\omega)=\int_{-\infty}^{+\infty}f_s(t)\exp(-j\omega t)dt$$
$$=F_s\int_{-\infty}^{+\infty}\exp\left(j\left[\frac{a}{2}t^2-(\omega-\omega_0)t+\phi_0\right]\right)dt$$
$$=(1+j)\sqrt{\frac{\pi}{a}}F_s\exp\left(j\left[-\frac{1}{2a}(\omega-\omega_0)^2+\phi_0\right]\right)$$
$$f_s(t)=\frac{1}{2\pi}\int_{-\infty}^{+\infty}F(\omega)\exp(j\omega t)d\omega$$

This shows that the phase of the Fourier coefficient $F(\omega)$ is a quadratic function of the angular frequency $\omega$.

By discretizing the Fourier coefficient $F(\omega)$ with the discrete frequencies $\omega_k=k\delta\omega$ (k is integer) of interval $\delta\omega$, $f_s(t)$ can be rewritten in the following form similar to SWIFT:

$$f_I(t)=\sum_k F_I\exp(j[\omega_k t+\phi_I(k)])$$
$$\phi_I(k)=-\frac{1}{2a}(\omega_k-\omega_0)^2+\phi_0=-\frac{1}{2a}(k\delta\omega-\omega_0)^2+\phi_0$$

This shows that, with discretely defined waveforms for scanning frequencies, the constant phase term $\phi_I(k)$ of each frequency component is represented as a quadratic function of k. It is supposed here that the two frequency components $\omega_k$ and $\omega_{k+1}$ take the same value at the time point $t_k$. This condition is expressed as follows:

$$\omega_k t_k+\phi_I(k)=\omega_{k+1}t_k+\phi_I(k+1)$$

From this equation, the following equation is deduced:

$$\omega_e(t_k)=at_k+\omega_0=\frac{\omega_k+\omega_{k+1}}{2}$$

This means that, when two adjacent frequency components are of the same phase and reinforcing each other, the frequency corresponds to the effective frequency of the composed waveform $f_I(t)$ at the time point $t_k$. Further, when the interval $\delta\omega$ is set adequately small, $f_I(t)$ becomes a good approximation of the frequency-scanning waveform $f_s(t)$. Therefore, the following discussion concerning the continuous waveform $f_s(t)$ is completely applicable also to the waveform $f_I(t)$ composed of discrete frequency components.

For ease of explanation, the initial condition is supposed as $\omega_0=0$ and $\phi_0=0$. This condition still provides a basis for generalized discussion because it can be obtained by the relative shifting of the axis of time to obtain $\omega_s(t)=0$ at t=0 and by including the constant phase into $F_s$. When $f_s(t)$ is set not too great, the ions demonstrate a simple harmonic oscillation with an angular frequency of $\omega_z$. Accordingly, with the amplitude z represented as a multiplication of a simple harmonic oscillation and an envelope function Z(t) that changes slowly, the equation of motion can be approximated as follows:

$$z=Z(t)\exp(j\omega_z t)$$
$$\frac{d^2z}{dt^2}+\omega_z^2 z=\left(\frac{d^2Z(t)}{dt^2}+2j\omega_z\frac{dZ(t)}{dt}\right)\exp(j\omega_z t)$$
$$\cong 2j\omega_z\frac{dZ(t)}{dt}\exp(j\omega_z t)$$

The term of the external force is given as follows:

$$\frac{f_s(t)}{m} = \frac{F_s}{m}\exp\left(j\frac{a}{2}t^2\right)$$

With this formula, the equation of motion can be further rewritten as follows:

$$\frac{dZ(t)}{dt} = \frac{F_s}{2jm\omega_z}\exp\left(j\left[\frac{a}{2}t^2 - \omega_z t\right]\right)$$

Supposing that the coefficient $F_s$ of the external force takes a constant value $F_0$ irrespective of time, and that the initial amplitude $Z(-\infty)=0$, the envelope function is obtained as follows:

$$Z(t) = \frac{F_0}{2jm\omega_z}\int_{-\infty}^{t}\exp\left(j\left[\frac{a}{2}\tau^2 - \omega_z\tau\right]\right)d\tau$$

$$= \frac{F_0}{2jm\omega_z}\sqrt{\frac{\pi}{a}}\exp\left(-j\frac{\omega_z^2}{2a}\right)\left[C(u) + jS(u) + \frac{1}{2}(1+j)\right]$$

$$u = \frac{at - \omega_z}{\sqrt{a\pi}} = \frac{\omega_e(t) - \omega_z}{\sqrt{a\pi}}$$

where C(u) and S(u) are the Fresnel integrals, and the term in the square brackets represents the length of the line connecting the points (−½, −½) and (C(u), S(u)) on the complex plane as shown in FIG. 2.

When the effective angular frequency $\omega_e(t)$ is equal to the secular frequency $\omega_z$ of the ion, the parameter is u=0, which represents the origin in FIG. 2. Application of the frequency-scanning waveform moves the point (C(u), S(u)) to (+½, +½), where the term in the square brackets is (1+j) and the residual amplitude $Z(+\infty)$ of the ion oscillation is given as follows:

$$Z(+\infty) = \frac{F_0}{2jm\omega_z}(1+j)\sqrt{\frac{\pi}{a}}\exp\left(-j\frac{\omega_z^2}{2a}\right) \equiv Z_{\max}$$

This calculation corresponds to the case where the excitation field is applied without any notch, because the amplitude coefficient of the excitation waveform is given the constant value $F_0$. The residual amplitude $Z(+\infty)=Z_{max}$ is almost constant irrespective of the mass m because m and $\omega_z$ are almost inversely proportional to each other. When $F_0$ is determined so that the absolute value of the envelope function $|Z_{max}|$ becomes greater than the size $z_0$ of the ion storage space, any ion with any m/e value is ejected from the ion storage space. In an ion trap mass spectrometer, the actual oscillation of ions takes places around the central position defined by the pseudo-potential well model, with the amplitude of about $(q_z/2)z$ and the RF frequency of Ω, where $q_z$ is a parameter representing the ion storage condition, written as follows:

$$q_z = \frac{2eV}{mz_0^2\Omega^2}$$

This shows that the maximum amplitude is about $|Z(+\infty)|(1+q_z/2)$. It should be noted that this amplitude becomes larger as the mass number of the ion is smaller and $q_z$ is accordingly greater.

When the waveform for exciting ions has a notch, the amplitude coefficient $F_s$ is described as a function of time t or a function of effective frequency $\omega_e(t)=at$. The conventional techniques, however, employ such a simple method that the amplitude of the frequency components inside the notch is set at zero. That is, $F_s$ is given as follows (FIG. 3):

$$F_s(t) = \begin{cases} F_0 & \cdots \quad t \le t_1,\ t_2 \le t \\ 0 & \cdots \quad t_1 < t < t_2 \end{cases}$$

Since no external force exists in the time period $t_1<t<t_2$, the envelop function after the application of the excitation waveform, i.e. the residual amplitude $Z(+\infty)$, is represented by a formula similar to the aforementioned one, as shown below:

$$Z(+\infty) = \frac{F_0}{2jm\omega_z}\left(\int_{-\infty}^{t_1} + \int_{t_2}^{+\infty}\right)\exp\left(j\left[\frac{a}{2}\tau^2 - \omega_z\tau\right]\right)d\tau$$

$$= \frac{F_0}{2jm\omega_z}\sqrt{\frac{\pi}{a}}\exp\left(-j\frac{\omega_z^2}{2a}\right)\times[(1+j) - \{C(u_2) + jS(u_2) - C(u_1) - jS(u_1)\}]$$

where $u_1$ and $u_2$ are the parameters of the Fresnel functions at time points $t_1$ and $t_2$. Similar to the case of the excitation waveform with no notch, the term in the last square brackets represents the vector sum of the two vectors: one extending from (−½, −½) to $(C(u_1), S(u_1))$ and the other extending from $(C(u_2), S(u_2))$ to (−½, −½) in FIG. 2. In other words, the value represents the vector subtraction where the vector extending from $(C(u_1), S(u_1))$ to $(C(u_2), S(u_2))$ is subtracted from the vector extending from (−½, −½) to (−½, −½). When $u_1$ and $u_2$ are located in opposition to each other across the origin, or when $u_2=-u_1>0$, the residual amplitude $|Z(+\infty)|$ is smaller than $Z_{max}$ of the no-notch case. As the value of $u_2$ $(=-u_1)$ increases, the value of $|Z(+\infty)|$ decreases. The rate of decrease, however, is smaller when $u_2$ $(=-u_1)$ is greater than 1.

For the selection of ions, $t_1$ and $t_2$ are determined so that the secular frequency $\omega_Z$ of the target ions to be left in the ion storage space comes just at the center of the frequency range of the notch: $\omega_e(t_1)$ to $\omega_e(t_2)$. That is, the frequency $\omega_c \equiv \omega_e(t_c) = (\omega_e(t_1)+\omega_e(t_2))/2$ at the time point $t_c \equiv (t_1+t_2)/2$ is made equal to $\omega_z$. Under this condition, the residual amplitude $|Z(+\infty)|$ is so small that it does not exceed the size of the ion storage space, so that the ions are kept stored in the ion storage space. Increase in the width of the notch, or in the distance between $\omega_e(t_1)$ and $\omega_e(t_2)$, provides a broader mass range for the ions to remain in the ion storage space and hence deteriorates the resolution of ion selection. Therefore, the width of the notch should be set as narrow as possible. The narrower notch, however, makes the residual amplitude $|Z(+\infty)|$ larger, which becomes closer to the value of the no-notch case. When the width of the notch is further decreased, the ions to be held in the ion storage space are ejected from the space together with other ions to be ejected. Accordingly, to obtain a high resolution of ion selection, the scanning speed a of the angular frequency needs to be set lower to make $\sqrt{a\pi}$ smaller, in order to make |u| greater, while maintaining the frequency difference $|\omega_e(t)-\omega_z|$ small. This requires a longer time period for scanning the frequency range, from which arises a problem that the throughput of the system decreases due to the longer time period for performing a series of processes.

When $u_1=-1$ and $u_2=+1$, the value of the term in the square brackets (i.e. length) is about 0.57, which cannot be regarded as small enough compared to 1.41 which is the absolute value of the term in the square brackets for the ions outside the notch. For example, unnecessary ions outside the notch are ejected from the ion storage space when the excitation voltage is adjusted so that the residual amplitude $Z_{max}$ after the application of the selecting waveform is $1.41z_0$. In this case, the ion to be held in the space, having its secular frequency equal to the frequency $\omega_c$ at the center of the notch, has the residual amplitude of $0.57z_0$. Though the ion is held in the ion storage space, its motion is relatively unstable. The maximum amplitude increases to about $0.75z_0$ during the application of the selecting waveform, reaching the region where the secular frequency of the ion changes due to the influence of the hole of the end cap electrode. Thus, under a certain initial condition, the ion is ejected from the ion storage space.

When $u_1=-0.5$ and $u_2=+0.5$, the scanning speed of the angular frequency is increased fourfold, and the time required for scanning the frequency is shortened to a quarter. In this case, the ion to be held in the space, having its secular frequency equal to the frequency $\omega_c$ at the center of the notch, has a residual amplitude of $0.87z_0$, and almost all the ions are ejected during the application of the selecting waveform.

As explained above, the conventional methods are accompanied by a problem that the resolution of ion selection cannot be adequately improved within a practical time period of ion selection. In other words, an improvement in the resolution of ion selection causes an extension of the time period of ion selection in proportion to the second power of the resolution.

Another problem is that the ions, oscillating with large amplitude immediately after the application of the ion-selecting waveform, are very unstable because they are dissociated by the collision with the molecules of the gas in the ion storage space. Also, an adequate cooling time is additionally required for damping the oscillation of the ions before the start of the next process.

Still another problem is that, when the excitation field is composed of frequency components with random phases, as in the FNF, the phases of the frequency components in the vicinity of the notch cannot be properly controlled, so that it is difficult to select ions with high resolution.

The present invention addresses the above problems, and proposes a method of selecting ions in an ion storage device with high resolutions in a short time period while suppressing oscillations of ions immediately after the selection.

SUMMARY OF THE INVENTION

To solve the above problems, the present invention proposes a method of selecting ions in an ion storage device with high resolution in a short period of time while suppressing amplitude of ion oscillation immediately after the selection. In a method of selecting ions within a specific range of mass-to-charge ration by applying an ion-selecting electric field in an ion storage space of an ion storage device, the ion-selecting electric field is produced from a waveform whose frequency is substantially scanned within a preset range, and the waveform is made anti-symmetric at around a secular frequency of the ions to be left in the ion storage space.

One method of making the waveform anti-symmetric is that a weight function, whose polarity reverses at around the secular frequency of the ions to be left in the ion storage space, is multiplied to the waveform.

Another method of making the waveform anti-symmetric is that a value of $(2k+1)\pi$(k is an arbitrary integer) is added to the phases of the waveforms.

It is preferable that the frequency scanning of the waveform is performed in the direction of decreasing the frequency. Further, series of waveforms with different scanning speeds may be used to shorten the time required for the selection.

The residual amplitude of the ions that are left in the ion storage space after the ion-selecting waveform is applied can be suppressed by slowly changing the weight function of the amplitude at the boundary of the preset frequency range to be scanned. The form of the notch can be designed arbitrarily as long as the weight function is anti-symmetric across the notch frequency.

FIG. 1 shows an example of the ion-selecting waveform $f_s(t)$ according to the present invention and the weight function $F_s(t)$ for producing the above waveform.

The waveform according to the present invention is characteristic also in that the ion selection can be performed even with a zero width of the notch frequency.

The above-described ion-selecting waveforms whose frequency is substantially scanned is composed of plural sinusoidal waves with discrete frequencies, and each frequency component of the waveform has a constant part in its phase term which is written by a quadratic function of its frequency or by a quadratic function of a parameter that is linearly related to its frequency.

DETAILED DESCRIPTION OF A PREFERRED EMBODIMENT

Using formulae, the present invention is described in detail.

To describe the excitation waveform by its frequency components, the conventional methods use a complex amplitude in a polar coordinate, i.e. a magnitude and a phase. Therefore, the magnitude of the amplitude is always non-negative (i.e., either zero or a positive) real value: it is zero at the notch frequency, and is a positive constant value at other frequencies. Thus, in conventional methods, no measure was taken for reversing a polarity of the excitation voltage around the notch frequency.

Figure 1:
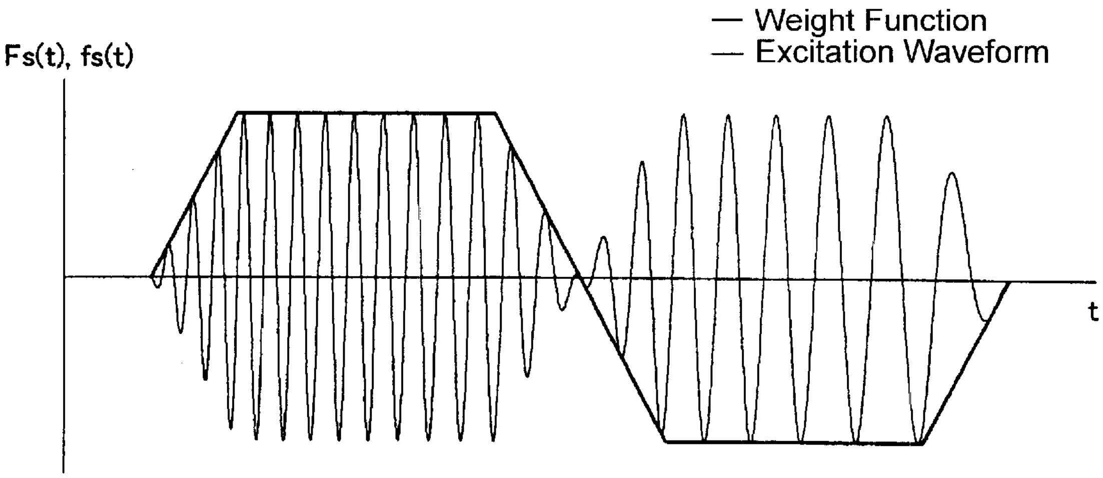
FIG. 1 shows an excitation voltage waveform for an ion selection, which is obtained by multiplying a frequency scanning waveform whose frequency decreases with time by an anti-symmetric weight function whose polarity is reversed at the notch frequency.
Figure 2:
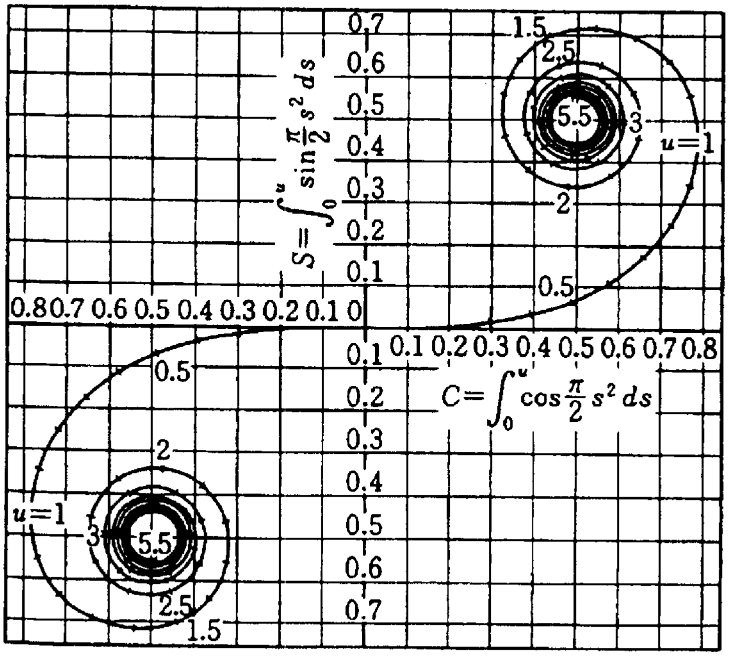
FIG. 2 is a graph plotting the relationship of the Fresnel function C(u) and S(u) with u as the parameter.
Figure 3:
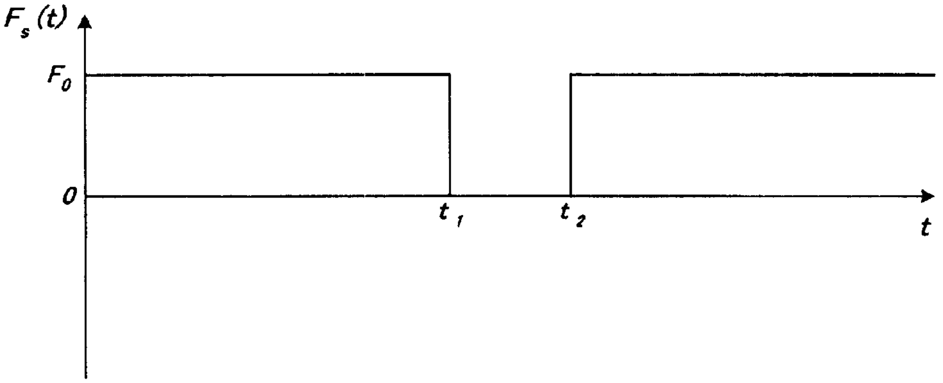
FIG. 3 shows a weight function with the notch according to conventional methods.
Figure 4:
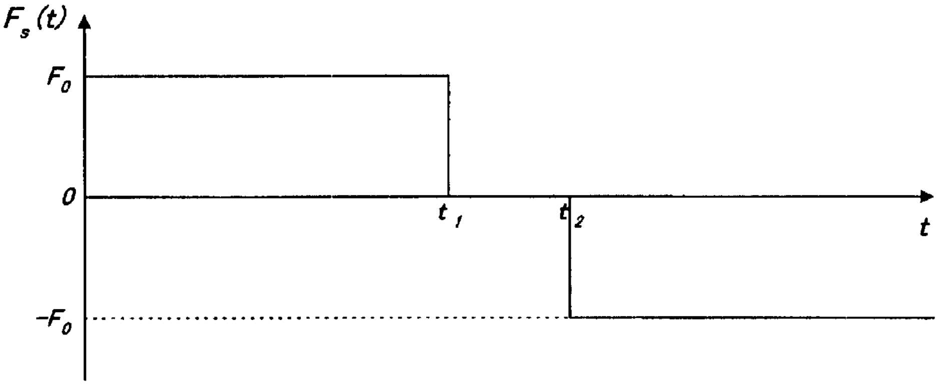
FIG. 4 shows a weight function according to the present invention, where the polarity is reversed around the notch.

In the present invention, a phase shift of (2k+1)π is given to the phase term around the notch to reverse the polarity of the excitation voltage. This method can be implemented in a simpler manner: the amplitude is multiplied by a weight function $F_s(t)$, whose polarity can be reversed (positive←→negative) around the notch. For example, the aforementioned function $F_s(t)$ is given as follows (see also FIG. 4):

$$F_s(t) = \begin{cases} F_0 & \cdots\ t \le t_1 \\ 0 & \cdots\ t_1 < t < t_2 \\ -F_0 & \cdots\ t_2 \le t \end{cases}$$

where $t_1$ and $t_2$ are time points corresponding to the notch frequencies $\omega_e(t_1)=at_1$ and $\omega_e(t_2)+at_2$. Similar to the above-described manner, the envelope function after the application of the excitation waveform, i.e. the residual amplitude $|Z(+\infty)|$, can be written as follows:

$$\begin{aligned} Z(+\infty) &= \frac{F_0}{2jm\omega_z}\left[\int_{-\infty}^{t_1} - \int_{t_2}^{+\infty}\right]\exp\left(j\left[\frac{a}{2}\tau^2 - \omega_z\tau\right]\right)d\tau \\ &= \frac{F_0}{2jm\omega_z}\sqrt{\frac{\pi}{a}}\exp\left(-j\frac{\omega_z^2}{2a}\right)\times \\ &\quad [C(u_1) + jS(u_1) + C(u_2) + jS(u_2)] \end{aligned}$$

Since C(u) and S(u) are odd functions of u, the residual amplitude Z(+∞) is zero when $u_2=-u_1>0$, or when the secular frequency $\omega_z$ of the ion is equal to the central frequency $\omega_c$ of the notch. When the secular frequency $\omega_z$ of the ion is slightly deviated from the central frequency $\omega_c$ of the notch, the residual amplitude can be written as follows:

$$Z(+\infty) \cong \frac{F_0}{2jm\omega_z}\exp\left(-j\frac{\omega_z^2}{2a}\right)\times\frac{2(\omega_c - \omega_z)}{a} \equiv Z_\infty$$

where the approximation C(u)+jS(u)≡u of the Fresnels functions C(u) and S(u) at |u|<1 is used. The above formula shows that the residual amplitude Z(+∞) is proportional to the deviation of the secular frequency $\omega_z$ of the ion from the central frequency $\omega_c$ of the notch. The residual amplitude does not depend on the width of the notch frequency because $u_1$ and $u_2$ simultaneously moves in the positive or negative direction as the secular frequency $\omega_z$ of the ion departs from the central frequency $\omega_c$ of the notch. When the secular frequency $\omega_z$ of the ion further deviates from the central frequency $\omega_c$ of the notch to make the absolute values of $u_1$ and $u_2$ sufficiently greater than 1, Z(+∞) takes approximately the same value as the residual amplitude $Z_{max}$ in the no-notch case or the one in the conventional notch case where the secular frequency $\omega_z$ deviates from the central frequency $\omega_c$.

The amplitude of the ion changes while the excitation voltage waveform is applied. Therefore, the amplitude is maximized when the secular frequency $\omega_z$ of the ion is inside the notch, i.e. between $t=t_1$ and $t=t_2$. The amplitude inside the notch is given as:

$$Z(t_1) = Z(t_2) = \frac{F_0}{2jm\omega_z}\sqrt{\frac{\pi}{a}}\exp\left(-j\frac{\omega_z^2}{2a}\right)\times \left[C(u_1) + jS(u_1) + \frac{1}{2}(1+j)\right]$$

When, on the other hand, the secular frequency $\omega_z$ of the ion is deviated further from the central frequency $\omega_c$, outside the notch, the maximum amplitude during the application of the excitation voltage waveform comes closer to the residual amplitude $Z_{max}$ of the no-notch case. As explained in the description of the conventional case, the voltage of the excitation waveform may be adjusted so that the residual amplitude $Z_{max}$ is $1.41z_0$ when the secular frequency $\omega_z$ of the ion is thoroughly deviated from the central frequency $\omega_c$ of the notch. In this case, the maximum amplitude during the excitation is about $0.29z_0$ for $u_1=-1$ and $u_2=1$. This amplitude is much smaller than $0.75z_0$ of the conventional case, so that the ions of interest can be easily selected. Even for $u_1=-0.5$ and $u_2=0.5$, the maximum amplitude is about $0.44z_0$, which still provides an adequate resolution of ion selection. Thus, even when the width $u_2-u_1$ of the notch is small, the maximum amplitude of the ion can be smaller than that in conventional methods. When the ion selection is performed with the same width of the notch frequency $\omega_e(t_2)-\omega_e(t_1)$, the scanning speed a of the angular frequency can be set higher, so that the time required for the ion selection is shortened.

When an enough time is available for the ion selection, the scanning speed is set low to make $\sqrt{a\pi}$ smaller than the given width of the notch frequency $\omega_e(t_2)-\omega_e(t_1)$. This increases $u_2-u_1$, which in turn decreases the maximum amplitude of the oscillation of ion whose secular frequency $\omega_z$ is inside the notch. Smaller amplitude decreases the energy of the ions to collide with the gas in the ion storage space, so that the quality of selection is improved. In practice, however, an enough time is hardly given for the ion selection, and the scanning speed should be determined considering the limited scanning time. Therefore, $\omega_e(t_2)-\omega_e(t_1)$ is set small to make $u_2-u_1$ small to improve the resolution of ion selection. The smaller $u_2-u_1$ is, however, the larger the maximum amplitude during the excitation becomes. Accordingly, in practice, appropriate values of $u_1$ and $u_2$ are around $u_1=-0.5$ and $u_2=0.5$, as shown in the above-described example.

Figure 5:
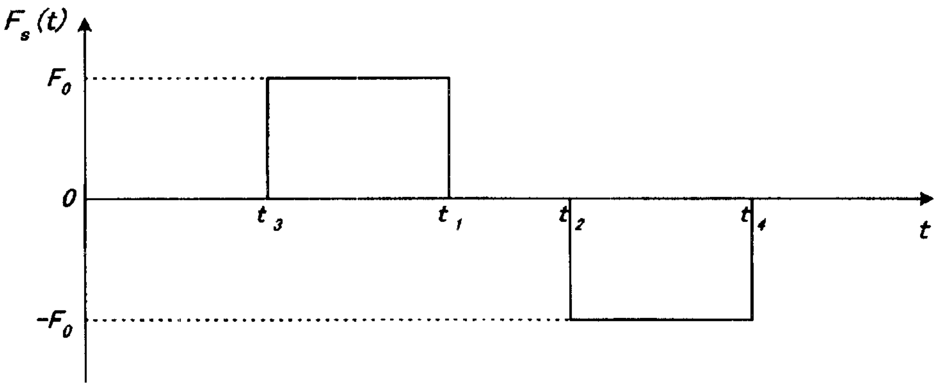
FIG. 5 shows a weight function according to the present invention with its polarity reversed around the notch, where the frequency scanning range is finitely defined.

For the convenience of explanation, the range of integration was supposed as (−∞, +∞) in the above description. In practice, however, the frequency is scanned over a limited range. When the range of integration is (−∞, +∞), the residual amplitude is |Z(+∞)|=0. In the case where the excitation waveform is applied from time $t_3$ to time $t_4$ (as shown in FIG. 5), the weight function is represented as follows:

$$F_s(t) = \begin{cases} F_0 & \cdots\ t_3 \le t \le t_1 \\ 0 & \cdots\ t < t_3,\ t_1 < t < t_2,\ t_4 < t \\ -F_0 & \cdots\ t_2 \le t \le t_4 \end{cases}$$

and the residual amplitude is given as follows:

$$
\begin{aligned}
Z(+\infty) &= \frac{F_0}{2jm\omega_z}\int_{t_3}^{t_1} - \int_{t_2}^{t_4}\exp\left(j\left[\frac{a}{2}\tau^2 - \omega_z\tau\right]\right)d\tau \\
&= \frac{F_0}{2jm\omega_z}\sqrt{\frac{\pi}{a}}\exp\left(-j\frac{\omega_z^2}{2a}\right)\times[C(u_1)+jS(u_1)+C(u_2)+ \\
&\quad jS(u_2)-C(u_3)-jS(u_3)-C(u_4)-jS(u_4)] \\
&= Z_\infty + \frac{F_0}{2m\omega_z}\left[\frac{1}{at_3-\omega_z}\exp\left(j\left[\frac{a}{2}t_3^2 - \omega_z t_3\right]\right)\right] + \\
&\quad \frac{F_0}{2m\omega_z}\left[+\frac{1}{at_4-\omega_z}\exp\left(j\left[\frac{a}{2}t_4^2 - \omega_z t_4\right]\right)\right]
\end{aligned}
$$

This shows that $Z(+\infty)$ differs from $Z_\infty$ because of the remaining terms inversely proportional to the frequency deviations $at_3-\omega_z$ and $at_4-\omega_z$ at the time points $t_3$ and $t_4$. It should be noted that the last formula is an approximation created on the assumption that the frequency deviations at the time points $t_3$ and $t_4$ are greater than $\sqrt{a\pi}$.

Figure 6:
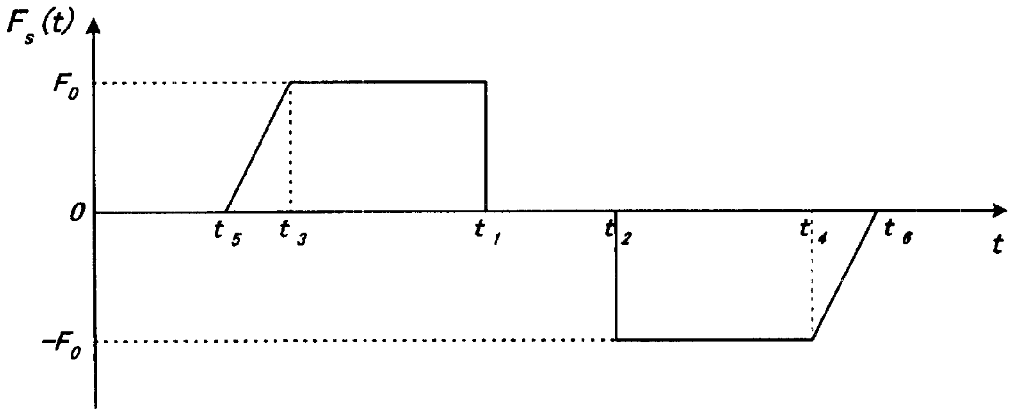
FIG. 6 shows a weight function according to the present invention with its polarity reversed around the notch and with its frequency scanning range finitely defined, where slopes are provided at the outer boundaries of the scanning range.

In general, when the ion selection is to be performed with high resolution, the scanning speed should be low and, simultaneously, the scanning range of frequency should be narrowed to shorten the time required for scanning. The problem arising thereby is that the narrower the scanning range of frequency is, the larger the residual amplitude becomes. Therefore, the present invention linearly changes the weight function with time at the boundary of the scanning range of frequency. Referring to FIG. 6, the weight function $F_s(t)$ is linearly increased from zero to $F_0$ over the time period from $t_5$ to $t_3$. The contribution of this part to the integral value is as follows:

$$
\begin{aligned}
&\frac{F_0}{2jm\omega_z}\int_{t_5}^{t_3}\frac{\tau - t_5}{t_3 - t_5}\exp\left(j\left[\frac{a}{2}\tau^2 - \omega_z\tau\right]\right)d\tau = \\
&\quad \frac{F_0}{2jm\omega_z}\left[\frac{1}{j(at_3-at_5)}\exp\left(j\left[\frac{a}{2}\tau^2 - \omega_z\tau\right]\right)\right]_{t_5}^{t_3} - \\
&\quad \frac{F_0}{2jm\omega_z}\frac{at_5-\omega_z}{at_3-at_5}\int_{t_5}^{t_3}\exp\left(j\left[\frac{a}{2}\tau^2 - \omega_z\tau\right]\right)d\tau \cong \\
&\quad\quad \frac{F_0}{2m\omega_z}\left[\frac{-1}{at_3-\omega_z}\exp\left(j\left[\frac{a}{2}t_3^2 - \omega_z t_3\right]\right)\right]
\end{aligned}
$$

This value cancels the second term of the above formula of the residual amplitude $Z(+\infty)$. Similarly, the weight function $F_s(t)$ is linearly increased from $-F_0$ to zero over the time period from $t_4$ to $t_6$. The contribution of this part to the integral value cancels the third term of the formula of the residual amplitude $Z(+\infty)$. Thus, by linearly changing the weight function $F_s(t)$ with time at the boundary of the scanning range of angular frequency, the residual amplitude results in $Z(+\infty)=Z_\infty$ even in the case where the scanning range of angular frequency is limited, and the residual amplitude is brought to zero when the secular frequency $\omega_z$ of the ion is equal to the central frequency $\omega_c$ of the notch.

The linear change of the weight function with time can be introduced also in the part at the boundary of the notch frequency similar to the case of the boundary of the scanning range. Since the form of the notch can be determined arbitrarily, similar performance can be obtained by simply determining the weight coefficient to be anti-symmetric around the central frequency $\omega_c$ of the notch. That is, to make the function odd around $t=t_c$, $F_s(t)$ has only to satisfy the following condition inside the notch $t_1<t<t_2$:

$$F_s(t) = -F_s(2t_c - t)$$

The contribution of the part inside the notch to the integral value is as follows:

$$
\begin{aligned}
&\frac{1}{2jm\omega_z}\int_{t_1}^{t_2}F_s(t)\exp\left(j\left[\frac{a}{2}\tau^2 - \omega_z\tau\right]\right)d\tau = \\
&\quad \frac{1}{2jm\omega_z}\exp\left(-j\frac{\omega_z^2}{2a}\right)\int_{t_1}^{t_2}F_s(t)\exp\left(j\frac{(a\tau-\omega_z)^2}{2a}\right)d\tau
\end{aligned}
$$

When the secular frequency $\omega_z$ of the ion is equal to the central frequency $\omega_c$ of the notch, the above integral is zero because the integrand is an odd function around $t=t_c$. For a waveform with the excitation voltage being zero inside the notch, the residual amplitude is originally zero, so that the residual amplitude is still zero even when the anti-symmetric weight function is introduced inside the notch.

Figure 7:
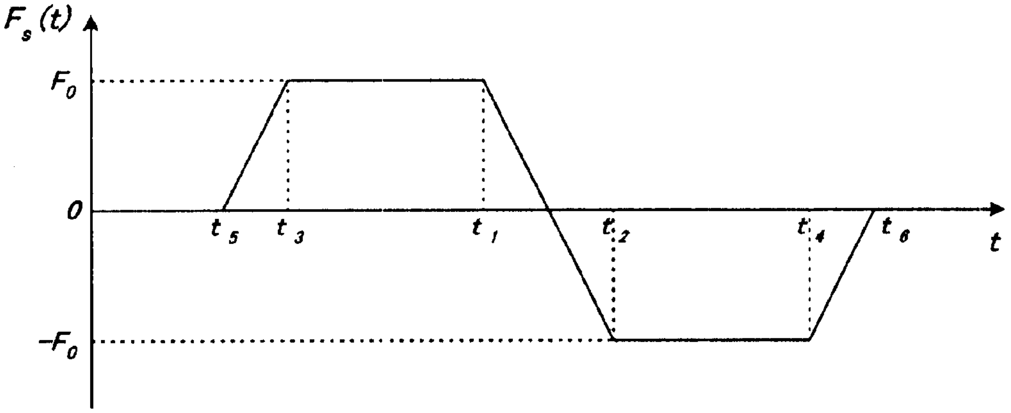
FIG. 7 shows a weight function according to the present invention with its polarity reversed around the notch and with its frequency scanning range finitely defined, where slopes are provided at the outer boundaries of the scanning range and at the notch frequency.

For example, a weight function including a straight slope extending from $t_1$ to $t_2$ also satisfies the above condition (FIG. 7). Including also the slopes at the boundary of the scanning range, the weight coefficient $F_s(t)$ is described as follows:

$$
F_s(t) = \begin{cases}
0 & \cdots \quad t < t_5 \\
F_0 t - \dfrac{t_5}{t_3 - t_5} & \cdots \quad t_5 \le t < t_3 \\
F_0 & \cdots \quad t_3 \le t \le t_1 \\
F_0 - 2t + t_1 + \dfrac{t_2}{t_2 - t_1} & \cdots \quad t_1 < t < t_2 \\
-F_0 & \cdots \quad t_2 \le t \le t_4 \\
F_0 t - \dfrac{t_6}{t_6 - t_4} & \cdots \quad t_4 < t \le t_6 \\
0 & \cdots \quad t_6 < t
\end{cases}
$$

Here, the residual amplitude is as follows:

$$
\begin{aligned}
Z(+\infty) &= Z_\infty + \frac{F_0}{2jm\omega_z}\int_{t_1}^{t_2}\frac{-2t+t_1+t_2}{t_2-t_1}\exp\left(j\left[\frac{a}{2}\tau^2 - \omega_z\tau\right]\right)d\tau \\
&= Z_\infty + \frac{F_0}{2jm\omega_z}\left[\frac{-2}{j(at_2-at_1)}\exp\left(j\left[\frac{a}{2}\tau^2 - \omega_z\tau\right]\right)\right]_{t_1}^{t_2} + \\
&\quad \frac{F_0}{2jm\omega_z}\frac{at_1+at_2-2\omega_z}{at_2-at_1}\int_{t_1}^{t_2}\exp\left(j\left[\frac{a}{2}\tau^2 - \omega_z\tau\right]\right)d\tau \\
&\cong Z_\infty + \frac{F_0}{2jm\omega_z}\exp\left(-j\frac{\omega_z^2}{2a}\right)\frac{-2}{j(at_2-at_1)}\left[j\frac{(a\tau-\omega_z)^2}{2a}\right]_{t_1}^{t_2} + \\
&\quad \frac{F_0}{2jm\omega_z}\exp\left(-j\frac{\omega_z^2}{2a}\right)\frac{at_1+at_2-2\omega_z}{at_2-at_1}\left[\frac{at-\omega_z}{a}\right]_{t_1}^{t_2} \\
&\cong Z_\infty
\end{aligned}
$$

This formula is the same as the formula of the waveform with the excitation voltage being zero inside the notch. The same calculation for the amplitude inside the notch brings about the following result:

$$
\begin{aligned}
Z(t) &= Z(t_1) + \frac{F_0}{2jm\omega_z}\int_{t_1}^{t}\frac{-2\tau+t_1+t_2}{t_2-t_1}\exp\left(j\left[\frac{a}{2}\tau^2 - \omega_z\tau\right]\right)d\tau \\
&\cong Z(t_1) + \frac{F_0}{2jm\omega_z}\exp\left(-j\frac{\omega_z^2}{2a}\right)\frac{-2}{j(at_2-at_1)}\left[j\frac{(a\tau-\omega_z)^2}{2a}\right]_{t_1}^{t} + \\
&\quad \frac{F_0}{2jm\omega_z}\exp\left(-j\frac{\omega_z^2}{2a}\right)\frac{at_1+at_2-2\omega_z}{at_2-at_1}\left[\frac{at-\omega_z}{a}\right]_{t_1}^{t} \\
&\cong \frac{F_0}{2jm\omega_z}\exp\left(-j\frac{\omega_z^2}{2a}\right)\left(\frac{1+j}{2}\sqrt{\frac{\pi}{a}} + \frac{at_1-\omega_z}{a} + \right.
\end{aligned}
$$

-continued $$\left.\frac{at-at_1}{a}\frac{at_2-at}{at_2-at_1}\right)$$

$$\cong \frac{F_0}{2jm\omega_z}\sqrt{\frac{\pi}{a}}\exp\left(-j\frac{\omega_z^2}{2a}\right)\left(\frac{1+j}{2}+u_1+\frac{(u-u_1)(u_2-u)}{u_2-u_1}\right)$$

For $t=t_1$ or $t=t_2$, the third term in the last larger brackets is zero and hence Z(t) is the same as the maximum amplitude of the waveform with the excitation voltage being zero inside the notch. The amplitude is maximized at $t=(t_1+t_2)/2$. When the secular frequency $\omega_z$ is equal to the central frequency $\omega_c$ of the notch, the amplitude is maximized at t=0, whose value is as follows:

$$Z(0)=\frac{F_0}{2jm\omega_z}\sqrt{\frac{\pi}{a}}\exp\left(-j\frac{\omega_z^2}{2a}\right)\left(\frac{1+j}{2}+\frac{u_1}{2}\right)$$

In comparison with the waveform with the excitation voltage being zero inside the notch, the maximum amplitude Z(0) becomes the same when the scanning speed is the same and the width of the notch frequency is doubled in this case. For the waveform with the excitation voltage being zero inside the notch, the optimal width of the notch is around $u_1=-0.5$ and $u_2=0.5$, as explained above. For the waveform with the weight function including the linear slope inside the notch, described hereby, the optimal width of the notch is around $u_1=-1.0$ and $u_2=1.0$.

With the weight function including the slope, sudden change in the voltage to zero does not occur at any time point. Therefore, with actual electric circuits, the waveform can be produced without causing a waveform distortion or secondary problems due to delay in response.

In actual measurements, it is often desirable to widen the notch frequency. One case is such that the ion to be selected has an isotope or isotopes that have the same composition and structure but different masses. If the isotopes produce the same fragment ions, it is possible to improve the sensitivity by using all the isotope ions to obtain the structural information. If the ion is multiply charged, the intervals of m/e values of the isotopes are often so small that these isotopes cannot be separately detected even with the highest resolution. In such a case, simultaneous measurement of all the isotopes is preferable and convenient to shorten the measurement time. Another case is such that an ion derived from an original ion is selected and analyzed together with the original ion. The derived ion is, for example, an ion produced by removing a part of the original ion, such as dehydrated ion. Another example is an ion whose reactive base is different from that of the original ion, such as an ion that is added a sodium ion in place of a hydrogen ion. For these ions, simultaneous analysis of the derived ion and the original ion improves the sensitivity, because they share the same structural information.

Figure 8:
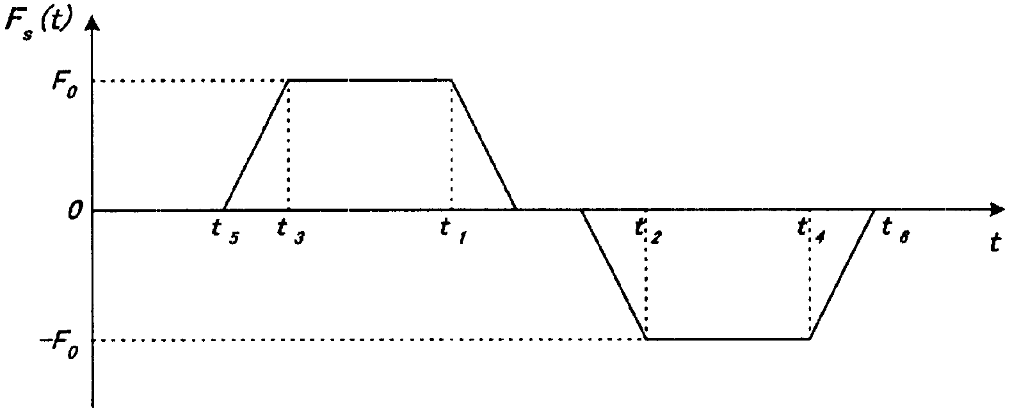
FIG. 8 shows a weight function according to the present invention with its polarity reversed around the notch, with its frequency scanning range finitely defined, and with slopes provided at the outer boundary of the scanning range and at the notch frequency, where a zero-weight section is inserted in the center of the notch.

For a waveform with the weight function being zero inside the notch (FIG. 6), the desirable effects can be obtained by simply widening the notch frequency to cover the frequencies corresponding to the m/e values of interest. For a waveform with the weight function having a slope inside the notch (FIG. 7), on the other hand, the selection performance cannot be improved by simply shifting the frequencies of both ends of the slope and drawing a new slope, because the residual amplitude of the ion is too large. A solution to this problem is to divide the slope at the point where the weight function is zero, to insert a zero-weight section between the divided slopes, keeping their inclination, and to widen the section to cover the frequencies corresponding to the m/e values of interest (FIG. 8). The resultant waveform can be obtained also by widening the frequency width of the notch of the waveform with the weight coefficient being zero inside the notch (FIG. 6) and providing slopes at both ends of the notch. This waveform is free from various problems due to sudden switching of the voltage to zero at the boundary of the notch, and the residual amplitude is almost zero inside the notch. Thus, this waveform provides high performance of ion selection.

In an ion trap mass spectrometer, the secular frequency of an ion changes according to the amplitude of the ion oscillation because the RF electric field is deviated from the theoretical quadrupole electric field, particularly around the openings of the end cap electrodes. In an ion selection with high resolution, the excitation voltage is set low and the frequency is scanned slowly. Such a condition allows the frequency deviation to occur when the amplitude of the ion is large, which prevents the excitation from being strong enough to eject the ions. The foregoing explanation supposes that the angular frequency be scanned in the direction of increasing frequency. In such a case, when the amplitude of the ion becomes large due to the excitation and the oscillation frequency of the ion becomes accordingly small, then the frequency deviation becomes greater with the scanning, and the excitation is no longer effective. One solution is to set the excitation voltage so high as to eject all the unnecessary ions even under a slight frequency deviation. This, however, deteriorates the resolution of ion selection because the frequency width of the notch needs to be widened so as not to eject the ions to be held existing at the center of the notch.

Accordingly, the present invention performs the scanning of angular frequency in the direction of decreasing frequency, particularly for ion selection with high resolution.

In an ion trap mass spectrometer, a proper design of the form of the electrodes creates an ideal RF electric field as the quadrupole electric field over a considerably wide range at the center of the ion storage space. For example, U.S. Pat. No. 6,087,658 discloses a method of determining the form of end cap electrodes, whereby an ideal RF electric field as the quadrupole electric field is produced within the range $z_0<5$ mm with the end cap electrodes positioned at $z_0\cong 7$ mm. In this case, the ions are not ejected but left in the ion storage space when the maximum amplitude of the ion whose secular frequency is inside the notch frequency is determined not to exceed 5 mm during the excitation. As for other ions having secular frequencies deviated from the notch frequency, the secular frequency starts decreasing after the maximum amplitude has exceeded 5 mm during the excitation. As the scanning further proceeds, the frequency of the ion excitation field becomes lower and resonates with the decreased secular frequency, which further increases the amplitude of the ion. The succession of increase in the amplitude and decrease in the secular frequency finally ejects the ions from the ion storage space. Thus, whether or not an ion is ejected depends on whether the amplitude of the ion reaches a position where the RF electric field starts deviating from the ideal quadrupole electric field, not on whether the amplitude of the ion reaches the position $z_0$ of the end cap electrode. This method provides an effective criterion of the ion selection within an extent of an ideal quadrupole electric field, so that the ion selection can be performed with high resolution, free from the influences due to the opening of the end cap electrodes or the like.

The results of the foregoing calculations are almost applicable to the case in which the angular frequency is scanned in the direction of decreasing frequency. Defining the scanning speed of the angular frequency as $a \equiv -b < 0$, the effective angular frequency is as follows:

$$\omega_e(t) = -bt.$$

This shows that the angular frequency takes a positive value for a negative value of time point. Therefore, the envelope function is as follows.

$$Z(t) = \frac{F_0}{2jm\omega_z}\int_{-\infty}^{t}\exp\left(-j\left[\frac{b}{2}\tau^2 + \omega_z\tau\right]\right)d\tau$$

$$= \frac{(-F_0)}{-2jm\omega_z}\sqrt{\frac{\pi}{a}}\exp\left(+j\frac{\omega_z^2}{2a}\right)\left[C(u) - jS(u) + \frac{1}{2}(1-j)\right]$$

$$u = \frac{bt + \omega_z}{\sqrt{b\pi}} = \frac{\omega_z - \omega_e(t)}{\sqrt{b\pi}}$$

Figure 9:
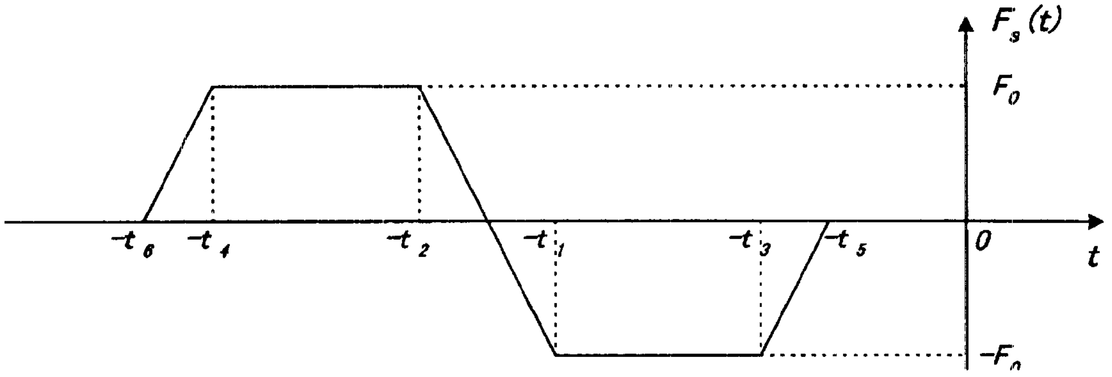
FIG. 9 shows a weight function for an ion-selecting waveform where the frequency is scanned in the direction of decreasing angular frequency.

Referring to the result of the scanning with increasing angular frequency, the above envelope function is merely a complex conjugate, so that all the foregoing discussions are applicable as they are to the present case. It should be noted, however, that the polarity of the weight function is reversed (FIG. 9).

In the ion selection with actual devices, the scanning speed should be set low when high resolution is desired. In general, an ion storage device can store a large mass range of ions. Therefore, to eject all the ions from the ion storage space, it is necessary to scan a wide range of angular frequencies, which is hardly performable at low scanning speed in a practical and acceptable time period. One solution to this problem is as follows. First, the entire range of angular frequencies is scanned at high scanning speed to preselect, with low resolution, a specific range of ions whose secular frequencies are relatively close to that of the ions to be held selectively. After that, a narrower range of angular frequencies, inclusive of the secular frequencies of the ions to be selected, are slowly scanned with a waveform of higher resolution. This method totally reduces the time required for ion selection. To obtain the desired resolutions, the selection should be performed using several types of selecting waveforms with different scanning speeds, as described above.

For a scanning with high resolution, the scanning direction of angular frequency is set so that the frequency decreases in that direction, as explained above. This manner of setting the scanning direction of angular frequency is effectively applicable also to a scanning at high speed and with low resolution.

In an ion trap mass spectrometer, the storage potential acting on an ion is inversely proportional to the m/e value of the ion even when the RF voltage applied is the same. Therefore, light ions gather at the center of the ion trap, while heavy ions are expelled from the center outwards. The light ions stored at the center of the ion trap produces a space charge, whereby the ion to be left selectively is affected so that its secular frequency shifts toward the lower frequencies. The secular frequencies of light ions that mostly contribute to the action of the space charge are higher than the secular frequency of the ion to be held selectively. Therefore, by setting the scanning direction of the angular frequency from high to low frequencies, the light ions can be ejected in an earlier phase of scanning, whereby the effect of the space charge is eliminated. This provides a preferable effect that the secular frequency of the ion to be held selectively is restored to the original value earlier. As a result of the removal of unnecessary ions, the ions to be held selectively gather at the center of the ion storage space. The initial amplitude of the ions should be set small; otherwise, since the maximum amplitude during the excitation is influenced by the initial amplitude, the desired resolution cannot be obtained, particularly in the case where the scanning is performed with high resolution. In this respect, the selection of ions using several types of selecting waveforms with different scanning speeds provides preferable effects because unnecessary ions are removed beforehand and the ions to be selected are given adequate time periods to gather at the center of the ion storage space.

In an ion trap mass spectrometer, the actual oscillation of ions takes places around the position z defined by the pseudo-potential well model as a guiding center, with the amplitude of about $(q_z/2)z$ at the RF frequency of $\Omega$. Therefore, a practical maximum amplitude is about $|Z(+\infty)|(1+q_z/2)$, which is larger as the mass number of an ion is smaller and hence $q_z$ is larger. One method of decreasing the maximum amplitude of small-mass ions to correct values is to multiply the correction factor $1/(1+q_z/2)$ into the weight function so that the excitation voltage at the secular frequency of the small-mass ions decreases. The relation between $q_z$ and the secular frequency of ion $\omega_z$ is described, for example, in "Quadrupole Storage Mass Spectrometry", John Wiley & Sons (1989), page 200. For example, one of the simplest approximate formulae applicable for $q_z \leqq 0.4$ is as follows:

$$\omega_z = \beta_z\frac{\Omega}{2} \cong \frac{q_z}{\sqrt{2}}\frac{\Omega}{2}$$

where $\beta_z$ is a parameter, taking a value between 0 and 1, which represents the secular frequency of an ion. In fact, however, application of this formula to the aforementioned correction factor does not give a good result, particularly for greater values of $q_z$. This is partly because the pseudo-potential model has only a limited application range. Therefore, the following formulae that have been obtained empirically as a correction factor for weight function are preferably used:

$$\frac{1}{1+2.0\beta_z^2} \text{ or }$$

$$1 - 0.9\beta_z\sqrt{\beta_z}$$

The constant values appearing in these formulae, 2.0 or 0.9, may slightly change depending on the form of the ion trap electrode actually used or on other factors. This correction of the weight function does not affect the calculation result on the envelope function because their change is slow. Particularly in the selecting waveform for scanning a narrow frequency range with high resolution, whether or not correction factor of the weight function is used makes no difference.

Figure 10:
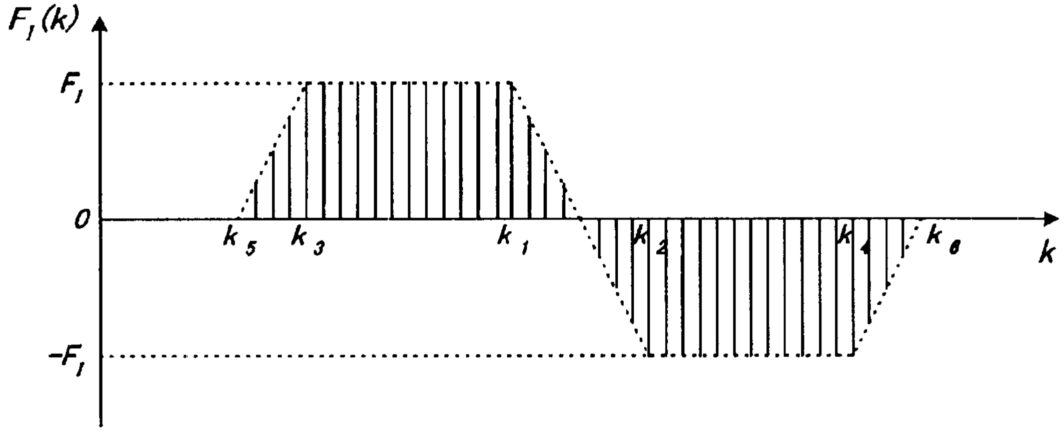
FIG. 10 shows an ion-selecting waveform with its frequency components discretized, where the method according to the present invention is applied to determine the amplitude coefficient of each frequency component.

In producing waveforms using actual devices, the foregoing discussion about the continuous waveform for scanning the angular frequency is applicable also to the case where the waveform is calculated at discrete time points $t_1 = i\delta t$ separated by a finite time interval of $\delta t$ (FIG. 10). Also, the same discussion is applicable to the SWIFT-like case using a waveform composed of discretely defined frequency components, where the substantially same functions are realized by shifting around the notch the phase value by the amount of $\pi$ multiplied by an odd integer, or by multiplying a weight function whose polarity is reversed around the notch.

Figure 11:
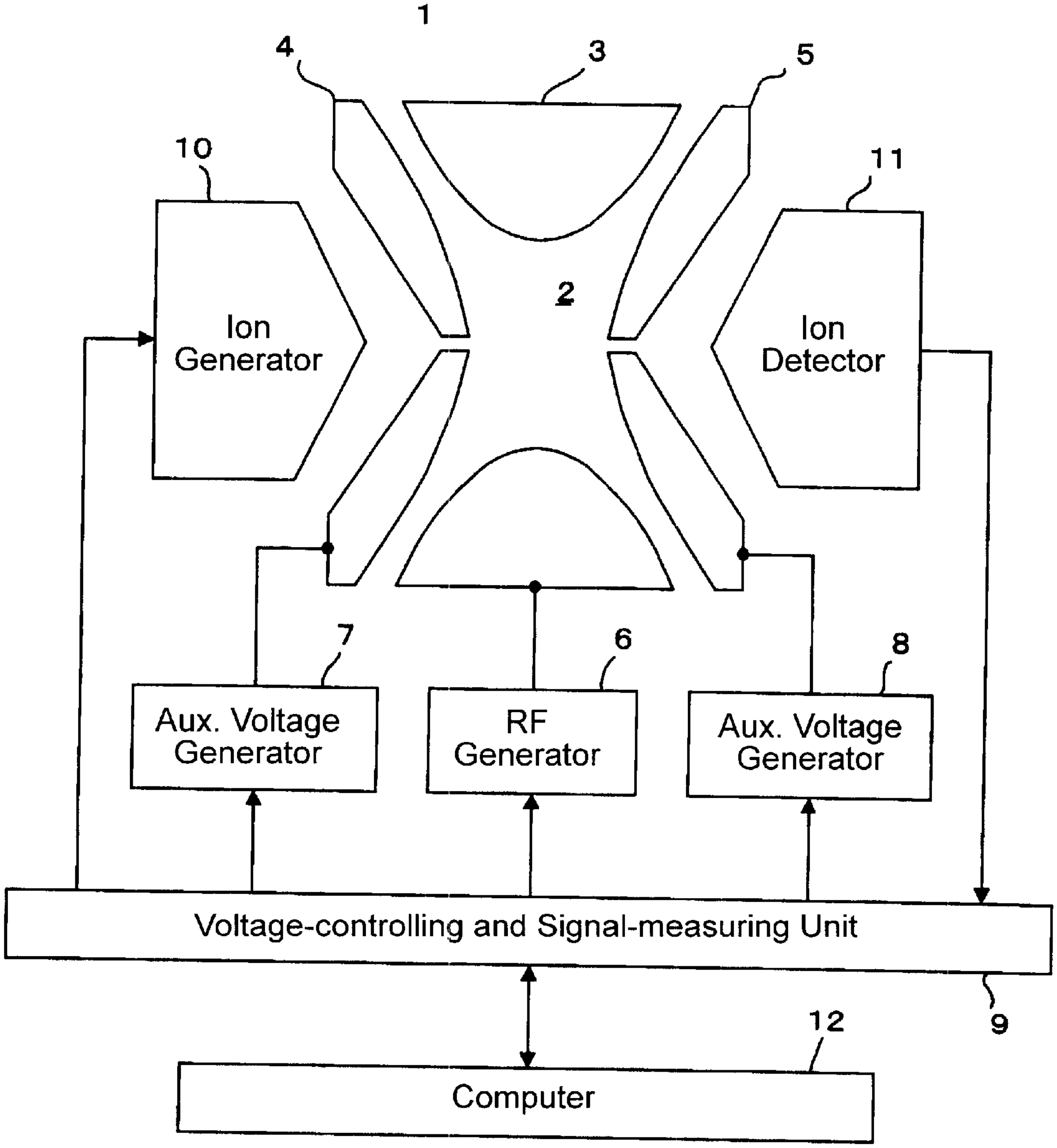
FIG. 11 shows the schematic construction of an ion trap mass spectrometer to employ an ion-selecting waveform of an embodiment of the invention.

The following part describes an embodiment of the method according to the present invention. FIG. 11 shows the schematic construction of an ion trap mass spectrometer to apply an ion-selecting waveform of this embodiment. The ion trap mass spectrometer includes an ion trap 1, an ion generator 10 for generating ions and introducing an appropriate amount of the ions into the ion trap 1 at an appropriate timing, and an ion detector 11 for detecting or analyzing ions transferred from the ion trap 1.

For the ion generator 10, the ionization method is selected in regard to the sample type: electron impact ionization for a gas sample introduced from a gas chromatograph analyzer; electron spray ionization (ESI) or atmospheric pressure chemical ionization (APCI) for a liquid sample introduced from a liquid chromatograph analyzer; matrix-assisted laser desorption/ionization (MALDI) for a solid sample accumulated on a plate sample, etc. The ions generated thereby are introduced into the ion trap 1 either continuously or like a pulse depending on the operation method of the ion trap 1, and are stored therein. The ions on which the analysis has been completed in the ion trap 1 are transferred and detected by the ion detector 11 either continuously or like a pulse depending on the operation of the ion trap 1. An example of the ion detector 11 directly detects the ions with a secondary electron multiplier or with a combination of micro channel plate (MCP) and a conversion dynode to collect their mass spectrum by scanning the storage condition of the ion trap 1. Another example of the ion detector 11 detects the ions transferred into a time-of-flight mass analyzer to perform a mass spectrometry.

The ion trap 1 is composed of a ring electrode 3, a first end cap electrode 4 at the ion introduction side, and a second end cap electrode 5 at the ion detection side. A radio frequency (RF) voltage generator 6 applies an RF voltage for storing ions to the ring electrode 3, by which the ion storage space 2 is formed in the space surrounded by the three electrodes. Auxiliary voltage generators 7, 8 at the ion introduction side and the ion detection side apply a waveform to the two end cap electrodes 4, 5 for assisting the introduction, analysis and ejection of the ions. A voltage-controlling and signal-measuring unit 9 controls the ion generator 10, ion detector 11 and aforementioned voltage generators, and also records the signals of the ions detected by the ion detector 11. A computer 12 makes the settings of the voltage-controlling and signal-measuring unit 9, and performs other processes: to acquire the signals of the ions detected and display the mass spectrum of the sample to be analyzed; to analyze information about the structure of the sample, etc.

In MS/MS type of mass spectrometry, the two auxiliary voltage generators 7, 8 apply ion-selecting voltages $\pm v_s$ of opposite polarities to the end cap electrodes 4, 5 to generate an ion-selecting field $E_s$ in the ion storage space 2.

The process of performing an MS/MS type of mass spectrometry is as follows. First, ions with various m/e values are introduced from the ion generator 10 into the ion storage space 2. Then, an ion-selecting field is applied to the ion storage space 2 to hold within the space 2 only such ions that have a particular m/e value while removing other ions from the space 2. Next, another special electric field is applied to the ion storage space 2 to dissociate the selected ions, or precursor ions, into fragment ions. After that, the mass spectrum of the fragment ions created in the ion storage space 2 is collected with the ion detector 11.

In this embodiment, the frequency of the RF voltage $\Omega$ is 500 kHz and the frequency at the center of the notch $\omega_c$ is 177.41 kHz. With these values, $\beta_z$ is about 0.71. When, for example, singly charged ions with a mass of 1000 u are to be selected, the RF voltage is set at 2.08 k V(0–p) to make the secular frequency of the ion equal to the central frequency $\omega_c$ of the notch.

When various ions of different mass numbers are introduced into the ion storage space, each ion has a secular frequency within the frequency range of 0–250 kHz according to its m/e value. To select the desired ions, this frequency range must first be scanned at high speed. Letting the time required for the first scanning be 1 ms, the scanning speed a of angular frequency is given as follows:

$$a = 2\pi \times \frac{250\ \text{kHz}}{1\ \text{ms}} = 2\pi \times 2.5 \times 10^8 s^{-2}$$

Accordingly, the angular frequency corresponding to u=1 is as follows:

$$\sqrt{\pi a} = 2\pi \times 11.18\ \text{kHz}$$

and the time required for scanning this frequency range is about 44.72 μs. The time required for scanning to 177.41 kHz is about 709.64 μs. The angular frequency corresponding to the slopes at the boundaries of the frequency range, i.e. 0 kHz and 250 kHz, is supposed as 11.18 kHz, and the angular frequency corresponding to the slopes at the notch frequency is supposed as ±11.18 kHz. The weight function is determined as shown in FIG. 9, where the frequency is scanned in the direction of decreasing frequency. Under such conditions, the time points at which the excitation voltage changes are identified, with reference to FIG. 9, as follows: $-t_6=-1$ ms, $-t_4=-955.28$ μs, $-t_2=-754.36$ μs, $-t_1=-664.92$ μs, $-t_3=-44.72$ μs and $-t_5=-0$ μs. Letting the excitation voltage be $v_s$=18V, a computer simulation of the ion oscillation was carried out, which showed that, after the application of the waveform, the mass range of the ions remaining in the ion storage space was about 1000±16 u. In this case, the residual amplitude of the ion having a mass number 1000 u is about 0.03 mm. Thus, the simulation proved that the ions selected by the ion-selecting waveform created according to the present invention have very small amplitude, as expected.

Next, to improve the resolution of ion selection, the frequency range ±10 kHz around the central frequency $\omega_c$ of the notch is scanned at the scanning speed of 1 ms. In this case, the parameters including the scanning speed are as follows:

$$a = 2\pi \times 2 \times 10^7\ s^{-2}$$

$$\sqrt{\pi a} = 2\pi \times 3.16\ \text{kHz}$$

Letting $v_s$=5V, a computer simulation of the ion oscillation was carried out, which showed that, after the application of the waveform, the mass number of the ions remaining in the ion storage space was about 1000±2 u. The simulation also showed that the waveform could eject ions having mass numbers within the range of 1000±30 u.

To select ions more precisely, the scanning time is now increased to 4 ms. Setting the scanning range ±2 kHz, the parameters are given as follows:

$$a = 2\pi \times 1 \times 10^6\ s^{-2}$$

$$\sqrt{\pi a} = 2\pi \times 0.707\ \text{kHz}$$

Setting $v_s$=1.1V, a computer simulation of ion oscillation was carried out, which showed that, after the application of the waveform, the mass number of the ions remaining in the ion storage space was about 1000±0.2 u. The residual amplitude of the ions having a mass number of 1000 u, however, was as large as about 1.01 mm. Such large residual amplitude is a result of the slow scanning, which keeps the ions in excited state for a long time and causes an incorrect change in the phase of oscillation due to the deviation from the ideal quadrupole field. When the voltage of the excitation waveform was lowered to $v_s$=1.0V, the mass number of the ions remaining in the ion storage space was about 1000±0.4 u, which means a deterioration of the resolution. When the voltage of the excitation waveform was raised to $v_s$=1.2V, all the ions in the ion storage space were ejected from the ion storage space. These results show that the ion selection with high resolution requires a precise control of the voltage of the excitation waveform.

In the case where the resolution required is lower than that in the above embodiment, a zero-voltage section should be provided at the center of the notch, as shown in FIG. 8. Then, the residual amplitude of the ion at the center of the notch becomes smaller, which improves the quality of ion selection. As described in the above embodiment, when three types of waveforms having different scanning speeds are successively applied, the ions with a mass number 1000 u can be selected with an accuracy of 1000±0.2 u. Then, the total time for the ion selection is 6 ms. It should be noted, however, that the above computer simulation was carried out without considering the change in the state of motion of the ions due to the collision with the molecules of the gas in the ion storage space. In actual devices, since the ions frequently collide with the molecules of the gas, the resolution actually obtained is expected to be somewhat lower than calculated.

Thus, the method of the present embodiment can provide a higher resolution in a shorter time period than conventional methods. Loss of ions due to the application of the ion-selecting waveform is ignorable because the residual amplitude after the application of the ion-selecting waveform can be made small. Another effect of the small residual amplitude is that the cooling time can be shortened.

The above embodiment describes the method of selecting ions according to the present invention, taking an ion trap mass spectrometer as an example. It should be understood that the present invention is applicable also to other types of ion storage devices to select ions with high resolution while suppressing the amplitude of ion oscillation immediately after the selection.

As described above, in the method of selecting ions in an ion storage device with high resolution in a short time period while suppressing amplitude of ion oscillation immediately after the selection, the method according to the present invention employs an ion-selecting waveform whose frequency is substantially scanned. By reversing the polarity of the weight function at around the notch frequency, the resolution can be improved and the time required for ion selection can be shortened. The resolution of ion selection can be improved also by setting the scanning direction in the decreasing frequency.

Also, by making the weight function anti-symmetric at around the notch frequency, or by slowly changing the amplitude of the weight function with time at the boundary of the frequency range to be scanned, the residual amplitude of the ions selectively held in the ion storage space after the application of the ion-selecting waveform can be made small, which allows the time required for the cooling process to be shortened. Further, use of plural ion-selecting waveforms having different scanning speeds reduces the time required for ion selection.

What is claimed is:

1. A method of selecting ions within a specific range of mass-to-charge ratio by applying an ion-selecting electric field in an ion storage space of an ion storage device, wherein said ion-selecting electric field is produced from a waveform whose frequency is substantially scanned, and said waveform is made anti-symmetric at around a secular frequency of the ions to be left in the ion storage space.

2. The method of selecting ions according to claim 1, wherein said waveform is made anti-symmetric by multiplying a weight function whose polarity reverses at around said secular frequency of the ions to be left in the ion storage space.

3. The method of selecting ions according to claim 1, wherein said waveform is made anti-symmetric by shifting a phase of said waveform by odd multiple of π, i.e. by adding (2k+1)π, where k is an arbitrary integer, to a phase of said waveform, at around said secular frequency of the ions to be left in the ion storage space.

4. The method of selecting ions according to claim 1, wherein the frequency of said waveform is scanned in a direction where the frequency decreases.

5. The method of selecting ions according to claim 2, wherein the frequency of said waveform is scanned in a direction where the frequency decreases.

6. The method of selecting ions according to claim 3, wherein the frequency of said waveform is scanned in a direction where the frequency decreases.

7. The method of selecting ions according to claim 1, wherein said waveform is multiplied by a weight function which is linearly changed at the boundaries of scanning range of frequency.

8. The method of selecting ions according to claim 2, wherein said waveform is multiplied by a weight function which is linearly changed at the boundaries of scanning range of frequency.

9. The method of selecting ions according to claim 3, wherein said waveform is multiplied by a weight function which is linearly changed at the boundaries of scanning range of frequency.

10. The method of selecting ions according to claim 4, wherein said waveform is multiplied by a weight function which is linearly changed at the boundaries of scanning range of frequency.

11. The method of selecting ions according to claim 5, wherein said waveform is multiplied by a weight function which is linearly changed at the boundaries of scanning range of frequency.

12. The method of selecting ions according to claim 6, wherein said waveform is multiplied by a weight function which is linearly changed at the boundaries of scanning range of frequency.

13. The method of selecting ions according to claim 1, wherein said waveform whose frequency is substantially scanned is composed of plural sinusoidal waves with discrete frequencies, where each frequency component of said waveform having a constant part in its phase term which is written by a quadratic function of its frequency or, in other words, by a quadratic function of a parameter which is linearly related to its frequency.

14. The method of selecting ions according to claim 2, wherein said waveform whose frequency is substantially scanned is composed of plural sinusoidal waves with discrete frequencies, where each frequency component of said waveform having a constant part in its phase term which is written by a quadratic function of its frequency or, in other words, by a quadratic function of a parameter which is linearly related to its frequency.

15. The method of selecting ions according to claim 3, wherein said waveform whose frequency is substantially scanned is composed of plural sinusoidal waves with discrete frequencies, where each frequency component of said waveform having a constant part in its phase term which is written by a quadratic function of its frequency or, in other words, by a quadratic function of a parameter which is linearly related to its frequency.

16. The method of selecting ions according to claim 1, wherein a plurality of said ion-selecting electric fields having different speeds of frequency scanning are used to select the ions with high resolution in a short period of time.

17. The method of selecting ions according to claim 2, wherein a plurality of said ion-selecting electric fields having different speeds of frequency scanning are used to select the ions with high resolution in a short period of time.

18. The method of selecting ions according to claim 3, wherein a plurality of said ion-selecting electric fields having different speeds of frequency scanning are used to select the ions with high resolution in a short period of time.

* * * * *